May 17, 1960

J. L. KELLY 2,936,866

THROTTLE CONTROL MECHANISM

Filed March 5, 1958

INVENTOR.
JOSEPH L. KELLY,
BY Threedy & Threedy.
HIS ATTORNEYS.

May 17, 1960 J. L. KELLY 2,936,866
THROTTLE CONTROL MECHANISM
Filed March 5, 1958 2 Sheets-Sheet 2

INVENTOR.
JOSEPH L. KELLY
BY Thredy & Thredy
HIS ATTORNEYS

United States Patent Office 2,936,866
Patented May 17, 1960

2,936,866

THROTTLE CONTROL MECHANISM

Joseph L. Kelly, Warrenville, Ill., assignor to Speedac, Inc., Warrenville, Ill., a corporation of Illinois Application March 5, 1958, Serial No. 719,220

2 Claims. (Cl. 192—3)

My invention relates to new and useful improvements in a throttle control mechanism and relates in particular to a throttle control mechanism for use with an automobile.

The principal object of my invention is in the provision in a device of this character of a simple and yet efficient means for manually latching the foot throttle pedal in a desired position.

Yet another object of my invention is in the provision in a device of this character of a means for automatically releasing the said throttle mechanism upon actuation of a brake pedal.

A yet further object of my invention is in the provision in a device of this character of a latch for the hand throttle which will automatically release itself when the accelerator pedal with which it is associated is activated.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 3:
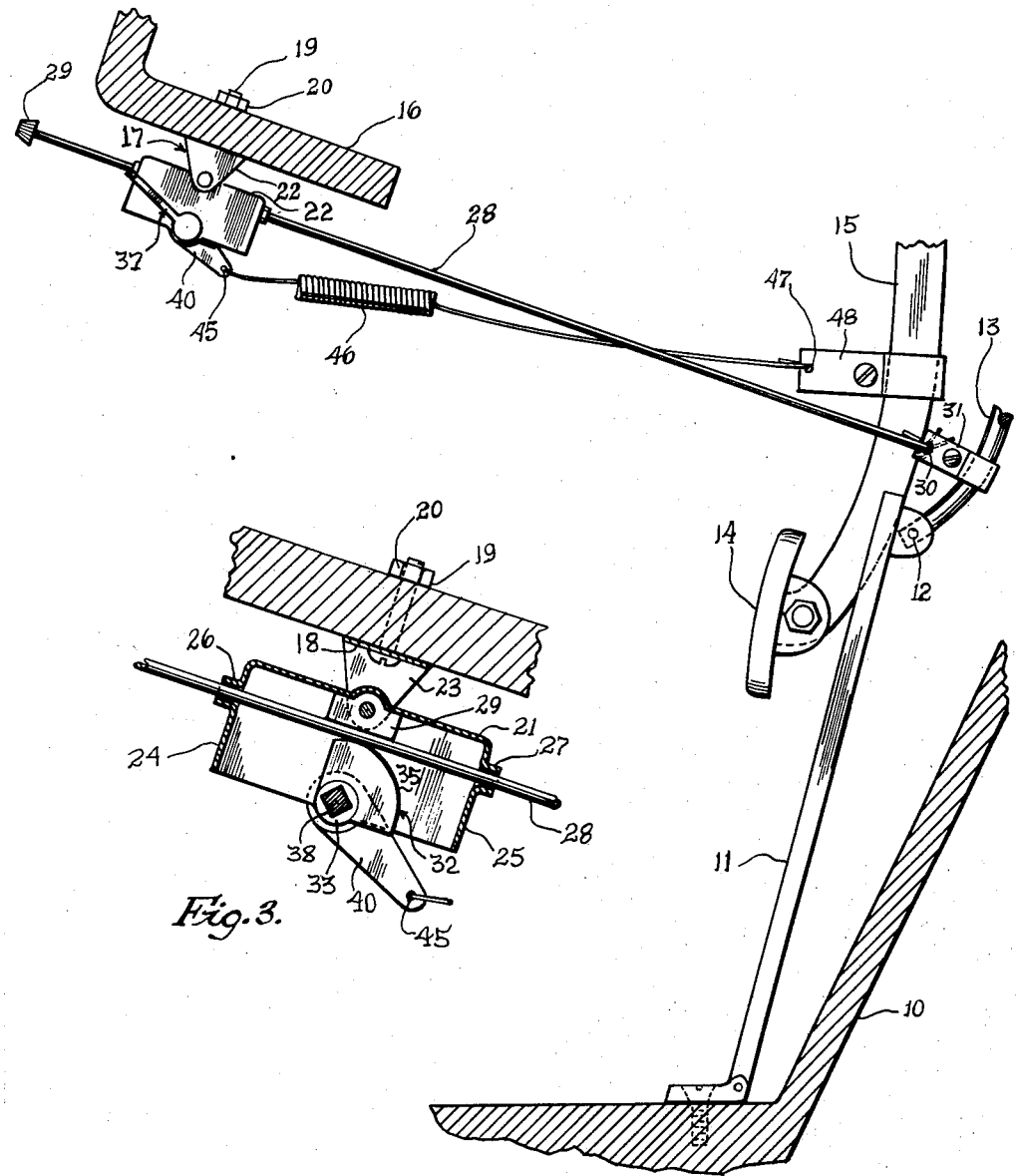
Fig. 1 is a fragmentary sectional side elevational view of my throttle control mechanism.
Fig. 3 is a fragmentary detail sectional view showing the latch member associated with my throttle control mechanism.

Referring to Fig. 1, I show a fragmentary sectional floor board 10 of a conventional automobile. Pivotally carried by such floor board 10 is a foot actuated accelerator pedal 11. This accelerator pedal is pivotally connected as at 12 to a throttle control linkage 13 shown in part. In close relation to the accelerator pedal 11, I show a foot brake pedal 14. This pedal 14 is supported by a depending brake operating linkage member 15. Also shown in Fig. 1 is a fragmentary sectional portion of the dash board panel 16.

Depending from the underside of the dashboard panel 16 is a U-shaped bracket 17. Through the bight portion 18 of this U-shaped bracket 17 passes a nut 19 which is associated with a bolt 20 for mounting said bracket 17 to the dashboard 16. A hollow housing 21 is fixedly carried between the parallelly extending spaced apart arms 22 and 23 of the U-shaped bracket 17. The end walls 24 and 25 of the housing 21 as seen in Fig. 3, each provide a laterally extending bearing 26 and 27 respectively. The bearings 26 and 27 are in longitudinal alignment and are adapted to freely receive therein a control rod 28. This control rod 28 terminates at one free end into a finger grip member 29'. The opposite free end of the rod 28 is pivotally connected as at 30 to a U-shaped clamp 31 which is fixedly attached to the linkage 13 of the accelerator pedal 11.

Figures 2, 4:
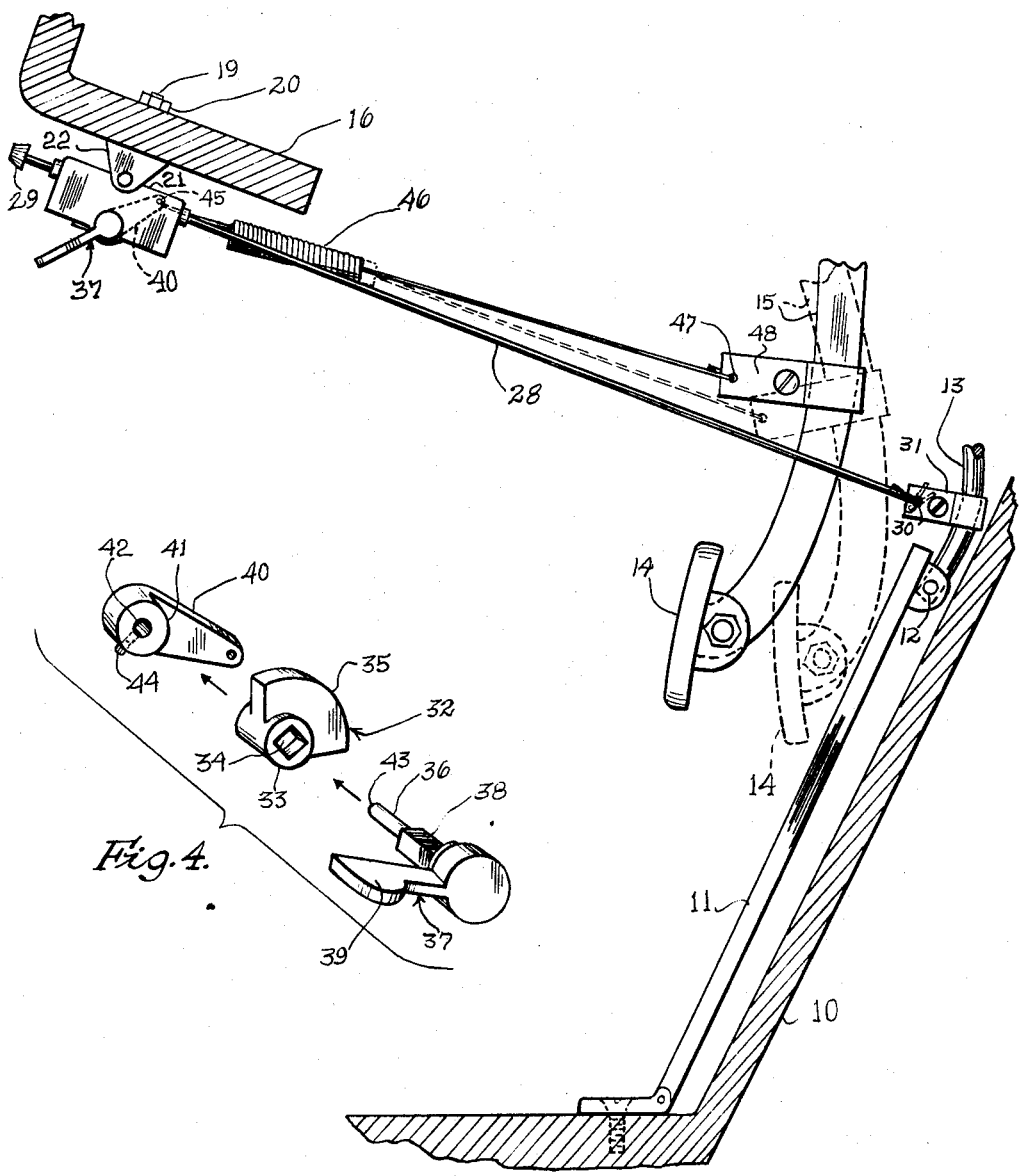
Fig. 2 is a fragmentary sectional view showing my throttle control mechanism in a latched position with the accelerator pedal associated therewith depressed and shown in dotted lines the movement of the brake pedal for releasing such mechanism.
Fig. 4 is an exploded perspective view of the movable parts of my throttle control mechanism.

The housing 21 provides internally thereof, a means which cooperates with a block 29 carried therein for frictionally latching the rod 28 against longitudinal movement through the bearings 26 and 27. This means comprises a cam member 32. This cam member 32 provides a circular bearing 33 which is of a length substantially equal to the inner dimension between the side walls of the housing 21. Through this circular bearing 33 is formed a square-shaped aperture 34. An actuated cam surface 35 extends laterally from the circular bearing 33 as seen in Figs. 3 and 4. Each of the side walls of the housing 21 is provided with horizontally aligned apertures. Through these apertures extends an arm 36 of an actuating lever 37. A portion 38 of the arm 36 is formed so as to be square in cross section and adapted to frictionally engage the square-shaped aperture 34 and the cam member 32. Such actuating lever 37 provides a finger grip 39 extending laterally therefrom exterior of one of the side walls of the housing 21. Adapted to be mounted exterior of the housing 21 adjacent the opposite side wall is a lever 40. This lever 40 provides a circular bearing 41 having a centrally located aperture 42 into which fits the end 43 of the leg 36 of the actuating lever 37. A suitable set screw 44 is employed to fixedly attach the lever 40 to the arm 36, with the lever 40 extending in an opposite direction from the arm 36 as is the finger grip 39. The free end of the lever 40 has fixedly connected thereto as at 45 one end of a coil spring 46. The opposite end of the coil spring 46 is fixedly connected as at 47 to a U-clamp 48 fixedly attached to the linkage 15 of the brake pedal 14.

In operation, the normal setting of the throttle control mechanism is shown in Fig. 1. In such figure the accelerator pedal 11 is free to be actuated to control the speed of the automobile. As the accelerator pedal 11 moves relative to the floor board 10, the rod 28 is free to move longitudinally through the housing 21. When the driver of the automobile has attained a speed which he wishes to maintain without the necessity of manual control the accelerator pedal 11, he will pivot the actuating lever in an anti-clockwise direction as seen in Fig. 1. Such movement of the actuating lever 37 will cause rotation of the cam surface 35 into engagement with the rod 28 so as to frictionally latch between the cam surface 35 and the block 29, the rod 28. Such a position of the heretofore described elements is shown in Fig. 2. If at any time the operator wishes to disengage the rod 28 from its latched position he need only pivot the lever 37 in a clockwise direction as seen in Fig. 1. The manual releasing movement of the lever 37 will be independent of any movement of the brake pedal 14 or the accelerator pedal 11.

If the operator of the automobile finds it necessary to decrease the speed, he may release the throttle control mechanism by depressing the brake pedal 14 such as is shown in the dotted lines in Fig. 2. Such movement of the linkage 15 of the brake pedal 14 will cause through a coil spring 46, a clockwise movement of the lever 40. As the lever 40 is fixedly connected to the arm 36 of the actuating lever 37, it will cause a likewise clockwise movement of the cam member 32 thus effecting releasing of the rod 28 and the accelerator pedal 11.

It may be in the operation of the automobile that the driver desires to increase the speed of the automobile after the throttle control mechanism is set as heretofore described. To do so all that is required is that the accelerator pedal 11 be further depressed. Such movement of the accelerator pedal 11 and its corresponding linkage 13 will cause the rod 28 to move in a direction through the housing 21 so as to effectively release the clamping effect of the cam surface 35 of the cam member 32.

It should be noted that by reason of the connection of the rod 28 to the linkage 13 of the accelerator 11, such rod 28 when not latched in any desired position may function as a manually operated hand throttle.

From the foregoing, it is apparent that I have provided by my invention a simple and yet efficient throttle control mechanism which will readily respond to any driving condition that might arise. Such throttle control mechanism is readily released by application of a brake, or through the necessity of increasing speed, be obtained as a result of depressing the accelerator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A throttle control mechanism for an automobile having an accelerator and a brake pedal, means including an independently operated latching device operatively connected to said accelerator to effectively releasably latch said accelerator in a selected depressed position, a connecting means having resilient lost motion between said brake pedal and said latching device permitting limited movement of said brake pedal with respect to said device, said latching device being operatively responsive to the initial movement of said accelerator in one direction or braking movement of said brake pedal beyond its permitted limited movement for releasing said accelerator from said latched position, said means being manually movable in said one direction to actuate said latching device to release said accelerator from said latched selected position independently of movement of said accelerator or said brake pedal.

2. A throttle control mechanism for an automobile having an accelerator and a brake pedal, an accelerator control rod connected at one end and movable with said accelerator and slidably journalled through a latching device of said mechanism, said latching device including a hollow housing having formed in opposite end walls protruding bosses for slidably guiding said rod through said housing, a cam within said housing extending in spaced parallel relation to opposite side walls of said housing and pivotable about a horizontally extending axis, a means within said housing in spaced relation to said cam and in facial longitudinal abutment with said rod when it is journalled through said housing for cooperating with said cam to releasably frictionally latch said rod against longitudinal movement in one direction through said housing, said rod cooperating with said cam to pivot the same in one direction out of latching relation with said means when said rod is moved in one direction through said housing by said accelerator, a manually operated lever on one exterior side of said housing and extending in a substantially vertical plane with respect thereto, said lever operatively connected to said cam for pivoting the same about a horizontal axis into and out of frictional latching position with respect to said last mentioned means, a release lever on the opposite exterior side of said housing and operatively connected to said cam for pivoting the same in an opposite direction about a horizontal axis so as to release said cam from latching position, means for connecting said release lever to said brake pedal for actuation thereby, said connecting means including a yieldable means for permitting limited movement of said brake pedal without corresponding movement of said release lever, said cam being manually movable by said lever to release the accelerator from a latched selected position independently of movement of said accelerator or said brake pedal.

References Cited in the file of this patent

UNITED STATES PATENTS

| | | |
|---|---|---|
| 384,027 | Dilgee | June 5, 1888 |
| 2,258,007 | Gonderman | Oct. 7, 1941 |
| 2,477,865 | Du Charme | Aug. 2, 1949 |
| 2,490,473 | Rodkey | Dec. 6, 1949 |
| 2,503,802 | Goutcher | Apr. 11, 1950 |
| 2,624,433 | Godbout | Jan. 6, 1953 |
| 2,666,510 | Pokorny | Jan. 19, 1954 |